J. S. Rice.
Felting Machine.
Nº 70021  Patented Oct. 22, 1867.

Witnesses
W. M. Gooding
Joseph Jones.

Inventor
John S. Rice

United States Patent Office.

JOHN S. RICE, OF NEWARK, NEW JERSEY.

Letters Patent No. 70,021, dated October 22, 1867.

IMPROVEMENT IN STEAM-RADIATORS FOR HATTERS' KETTLES.

The Schedule referred to in these Letters Patent and making part of the same.

TO ALL WHOM IT MAY CONCERN:

Be it known that I, JOHN S. RICE, of Newark, in the county of Essex, and State of New Jersey, have invented a new and improved Steam-Radiator for Hatters' Kettles; and I do hereby declare that the following is a full, clear, and exact description thereof, which will enable others skilled in the art to make and use the same, reference being had to the accompanying drawings, forming part of this specification.

Similar letters of reference indicate corresponding parts.

Figure 1:
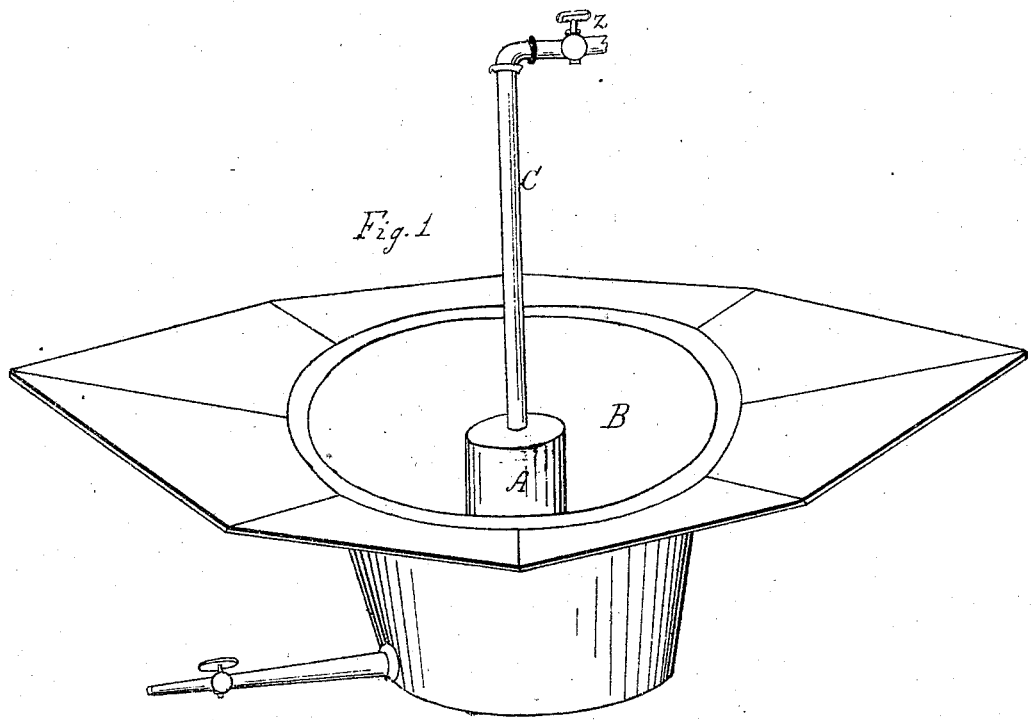
Figure 1 represents a perspective view of my invention.
Figure 2:
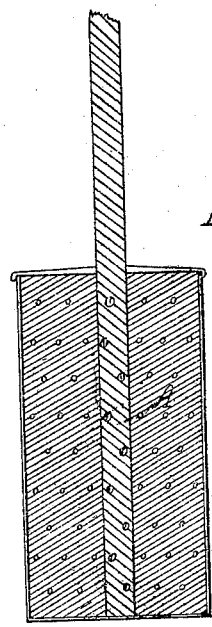
Figure 2 is a vertical sectional view of the same.

This invention relates to a new device for heating the water in a hatter's kettle; and consists in the use of a drum or cylinder inserted within the kettle, and of a steam pipe inserted within the cylinder.

Both the cylinder and the steam pipe are perforated, the holes in the cylinder being much finer than those in the pipe, so that the steam, which is conducted into the cylinder through the holes in the pipe, enters the kettle in very fine streams, and is distributed uniformly to all parts of the water in the kettle.

The object of this invention is to heat the water in the kettle to the desired degree, which can be regulated by means of a stop-cock in the steam pipe, and to have the water in the whole kettle of uniform temperature.

A represents a cylindrical drum with closed heads and perforated sides. It is made of sheet metal or other suitable material, and of suitable dimensions, and is placed upon the bottom of the hatters' kettle B, which is arranged and made in the ordinary manner. The dimensions of the kettle B may also be varied at pleasure, as well as the material from which it is made. C is a steam pipe, of suitable diameter and material, fitted through the top or bottom head of the drum A into the interior of the same. The end of the pipe C within the drum A is closed, so that the steam can only be discharged from the pipe C through perforations arranged in the sides of the same. The perforations are larger and in a much less number upon a given space of the pipe C than those in the sides of the drum A. The steam is, through the holes in the pipe C, discharged into the interior of the drum, and passes thence through the fine holes in the sides of the drum into the water contained in the kettle B. The amount of steam admitted to the drum can be regulated by a stop-cock, Z, arranged on the pipe C, as shown. The water can be discharged from the kettle B through a pipe, D, as shown. It is of no consequence whether the pipe C passes through the upper or lower head of the drum.

What I claim as my invention, and desire to secure by Letters Patent, is—

The arrangement of the perforated pipe C, perforated drum A, and kettle B, all constructed as and for the purpose set forth.

JOHN S. RICE.

Witnesses:
 W. M. GOOD,
 JOSEPH JONES.